United States Patent [19]

Odemer

[11] Patent Number: 4,881,295
[45] Date of Patent: Nov. 21, 1989

[54] HANDLE ASSEMBLY FOR REMOVABLE AUTO ELECTRONIC EQUIPMENT

[75] Inventor: Walter Odemer, Burbank, Calif.

[73] Assignee: Walter Odemer Co., Inc., Burbank, Calif.

[21] Appl. No.: 234,273

[22] Filed: Aug. 19, 1988

[51] Int. Cl.⁴ .......................... A47B 95/02; G12B 9/00
[52] U.S. Cl. .................................... 16/114 R; 248/27.1
[58] Field of Search ...................... 16/114 R; 248/27.1

[56] References Cited

U.S. PATENT DOCUMENTS

| | | | |
|---|---|---|---|
| 3,746,931 | 7/1973 | Muranaka | 248/27.1 |
| 4,572,465 | 2/1986 | Rasca | 248/27.1 |

Primary Examiner—Nicholas P. Godici
Assistant Examiner—Carmine Cuda
Attorney, Agent, or Firm—John E. Wagner

[57] ABSTRACT

A shuttle or recessed housing 11 for a vehicle radio and/or fixed recording player is disclosed. This shuttle is particularly designed to permit owner removal of such a unit 10 located in an attractive vehicle dashboard console 20 in which it is the desire that the release mechanism be totally or virtually concealed. A thin metal housing 11 conforms to the shape of the radio and tape cassette or compact disk player unit and has a narrow concealed edge flange on at least one edge of the front opening. Integral fingers 54 formed in the housing or shuttle 11 are bent outward to lock against the front panel or console 20. An antenna connection at the rear is provided with a pin 60 positioned directly behind the mating socket of the radio. Openings are present in at least the rear face of the shuttle 11 to allow the normal connectors of the radio 10 to engage mating connectors 52 in the shuttle 11. In one embodiment, a pair of ears, one on each side, to which a generally C shaped pivoted handle conforming precisely to the edge of the unit. When not used, the handle used to remove the unit is pivoted downward where it appears to be part of the dashboard or console trim. The handle assembly includes a thin frame which encircles the enclosure of the electronic equipment behind its flanged front face. Tabs extending into the equipment enclosure and are locked in place by locking bars secured within the equipment enclosure.

3 Claims, 9 Drawing Sheets

HANDLE ASSEMBLY FOR REMOVABLE AUTO ELECTRONIC EQUIPMENT

REFERENCE TO RELATED APPLICATIONS

Applicant cross-references his invention disclosed in a prior filed copending application entitled QUICK RELEASE MINIMUM PROFILE SHUTTLE, Ser. No. 098,560, filed 9/21/87. The relationship of the applications is as follows: An improvement.

BACKGROUND OF THE INVENTION

The theft of high quality radio and tape players from vehicles has become a major concern to the owners of vehicles. In many areas the presence of an expensive automobile is also a signal of the presence of a high quality valuable radio and tape player. Various attempts have been developed through the years to provide alarms, vehicle locks, radio locks and the like as deterrents to thieves. The effectiveness of such deterrents has not been great. Professionals have developed many ways to by-pass or neutralize auto alarms. In certain cities where expensive cars abound, the sound of an auto alarm is a common everyday occurrence and is usually ignored.

Locking devices which hold a radio in place only serve as a challenge to would-be thieves who often manage to remove the radio doing great damage to the console or panel. In many cases, the damage done by removal of the radio exceeds the value of the radio. The vehicle owner and the insurance company suffer an even greater loss by attempting to prevent the theft.

The only effective prevention against theft of high quality radios and radio tape players is removal from the vehicle while are not in use and the automobile is parked with an observable empty radio cavity. There is no incentive to break into a vehicle if it is apparent that there is no radio present. Attempts have been made to disguise radios by overlays. However professional thieves are well educated to that deception.

One of the difficulties with the removal and replacement of a radio is that the conventional mounting requires removal of mounting screws from underneath the panel, disconnecting several leads and pulling the radio forward through the panel. Quick disconnect holders for radios and particularly citizen band radios, have been developed through the years. Most of these are for under-dash mount, and not to be used in the dash or console. In such cases the radio itself disturbs the appearance of the dash and the owner is usually not concerned about the size of the mounting mechanism.

For in-dash or console quick removal devices, I have found that most are quite cumbersome and result in the radio protruding out of the dash or console, seriously detract from the appearance of the dash and consol. Likewise, I have found existing mechanisms with "quick release" connector or connectors at the rear of the radio require substantial force or manual disengagement to remove the radio.

Examples of quick release mechanisms for auto-radios are illustrated in the following patents:

I have also found that existing removal handles are not often truly effective.

BRIEF DESCRIPTION OF THE INVENTION

I have developed an auto-radio shuttle which is characterized in that it is a closely conforming thin metal open faced housing with an edge lip sufficient to engage the front face of the dash or console of an automobile yet fall behind the edge trim of the radio normally mounted in the dash or console. Integral fingers may be bent up behind the dash or console to secure the housing or shuttle in place. Low removal force connectors are positioned in the shuttle for direct engagement with the particular leads for power antenna and speakers of the radio installed. The housing or shuttle conform so closely to the exterior of the radio that direct alignment of the connectors is assured. Sufficient clearance exists between the interior walls of the housing or shuttle and the radio so that the radio may easily slide in and out.

The shuttle includes its own leads corresponding to those of the radio. These leads are connected in the mating vehicle leads so that once the shuttle is in place and the automobile leads connected to the shuttle, the radio is ready for installation.

A dummy or operative tape cassette including a handle which extends out of the tape player or radio is insertable into the tape player and into an engagement with the tape-holding elements such as the alignment pins or the drive capstan. The connectors are of such low force, the alignment of the radio in the shuttle so precise and the central location of the dummy tape are all such that a slight pull on the tape handle easily removes the radio tape player.

In an alternate embodiment, the edge flange includes a pair of ears which extend outward around the radio but do not extend beyond the front surface of the radio trim. A handle which conforms to the dimensions and shape of the front trim of the radio is pivoted to the pair of ears. The handle is pivotal into alignment with the front edge of the radio or outward at approximately a 90 degree angle to be used to draw the radio out of the shuttle.

In the particular features of this invention, the handle assembly for use with vehicle dash mounted electronic equipment includes a thin frame having an opening dimensioned to encircle the housing of an electronic equipment package behind its flanged front face. It employs inwardly extending tabs which openings in the electronic equipment package. A pair of locking bars hold the tabs in place and prevent their distortion when withdrawal forces are applied to a pivoted handle.

BRIEF DESCRIPTION OF THE DRAWING

This invention may more clearly understood from the following detailed description and by reference to the drawing in which:

FIG. 11 is a perspective view of the alternate embodimnt handle of FIG. 8;

FIG. 15 is a perspective view of the handle assembly of this invention attended to the front member of an electronic package.

DETAILED DESCRIPTION OF THE INVENTION

Figure 1:
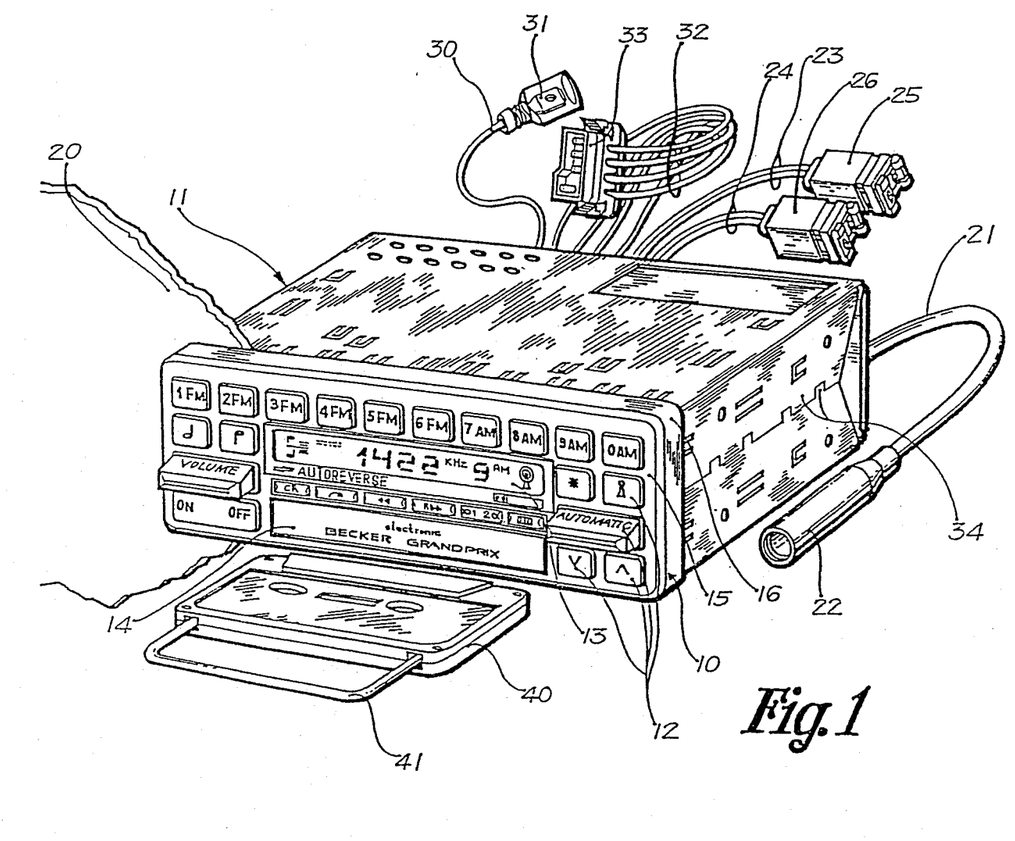
FIG. 1 is a perspective view of a high quality auto radio positioned in the shuttle of this invention.
Figure 5:
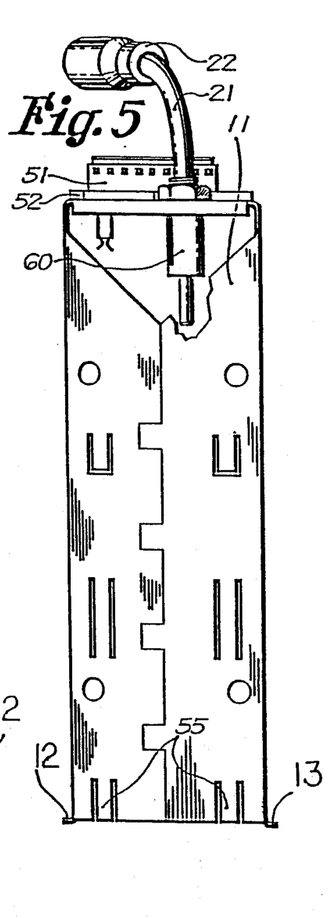
FIG. 5 is a side elevational view thereof.
Figure 6:
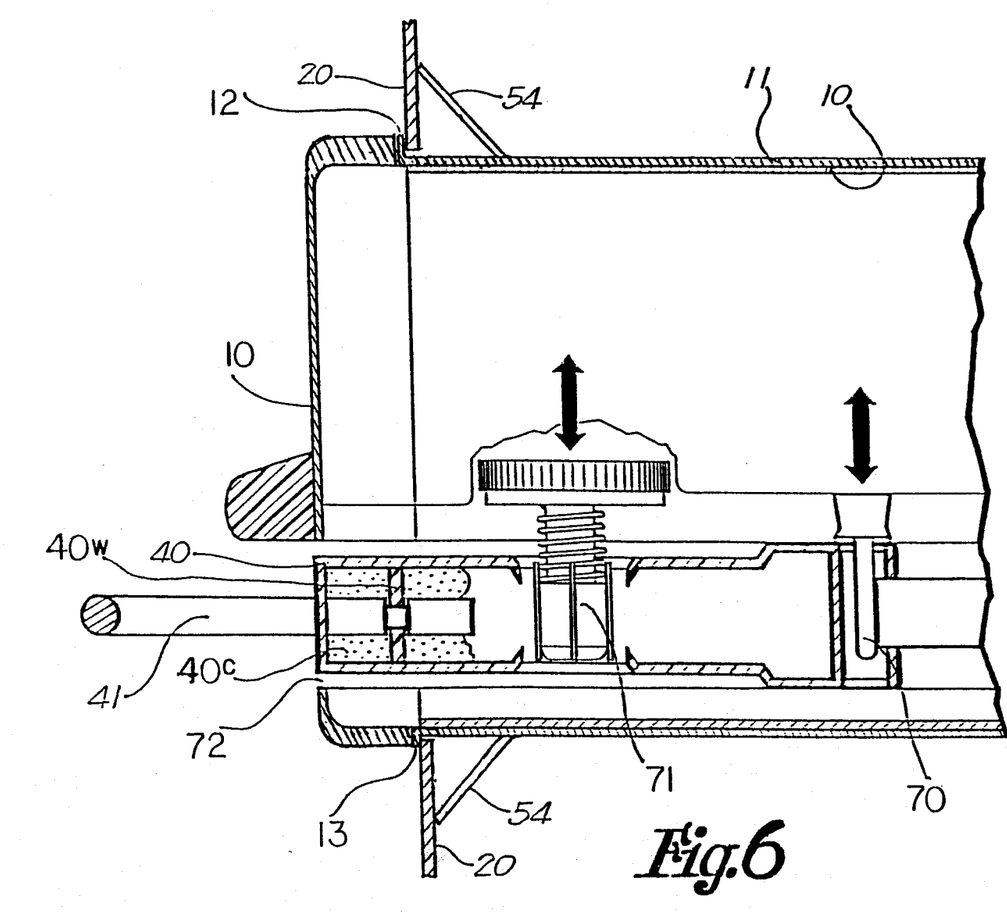
FIG. 6 is a vertical sectional view of the shuttle of the invention installed in a automobile dash with a radio in place taken along lines 6—6 of FIG. 1.

Now referring to FIGS. 1 through 6, a perspective view of a modern high quality auto radi-tape player generally designated 10 may be seen located within the shuttle or housing of this invention generally designated 11. As is common among auto radios, the radio 10 has have a number of controls generally designated 12 on the front. A dial 13 and a tape cassette player opening 14 apper in FIG. 1. The front face 15 of the radio 10 typically includes an outer rim or lip 16 which rests flush against the outer face of the console or dash 20, a fragmentary portion of which is shown in FIG. 1. The relationship between the radio front face 15, the dash or console 20 and the shuttle 11 are best seen in FIG. 6.

Figure 2:
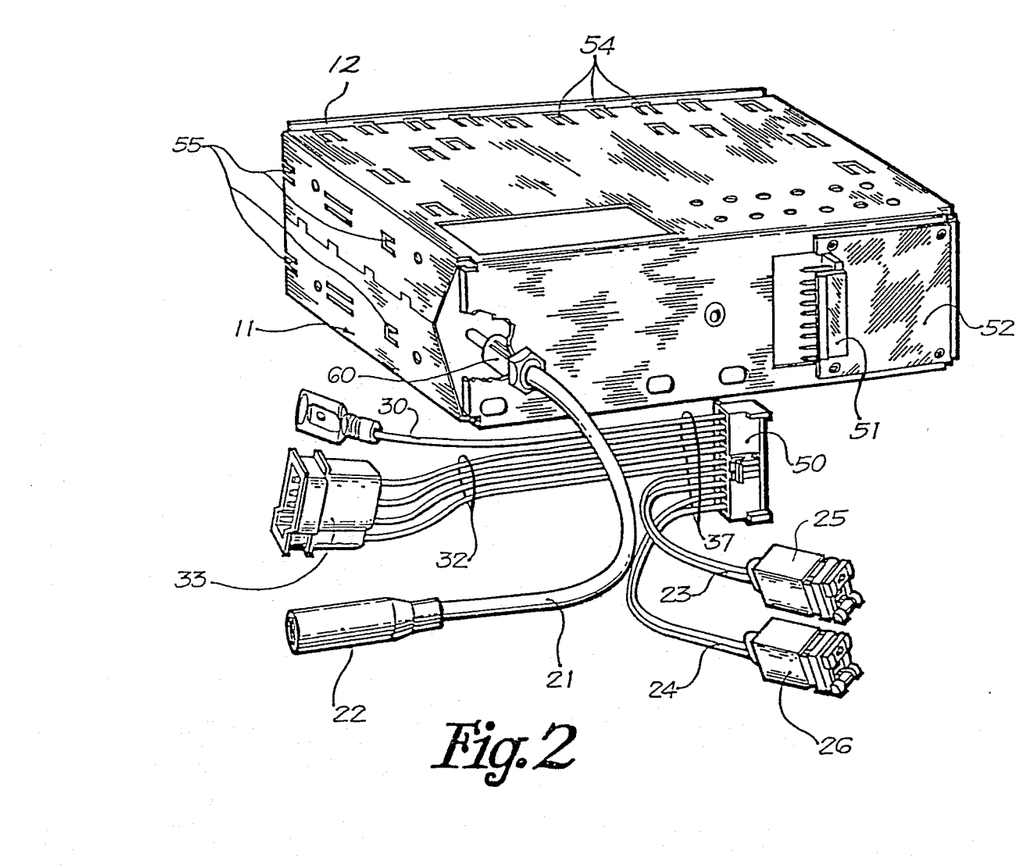
FIG. 2 is a rear perspective view of shuttle of FIG. 1.
Figure 3:
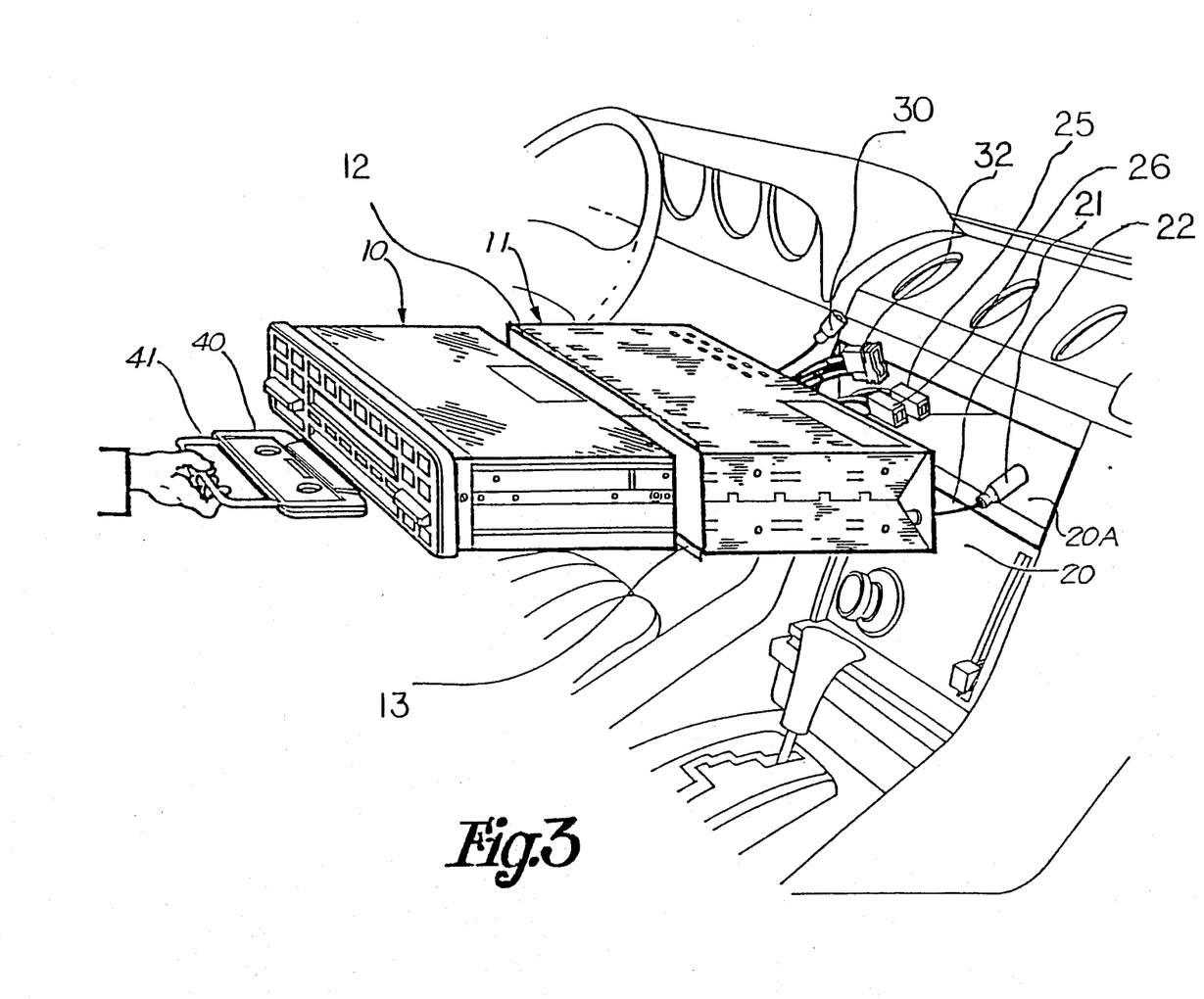
FIG. 3 is an exploded view thereof.
Figure 4:
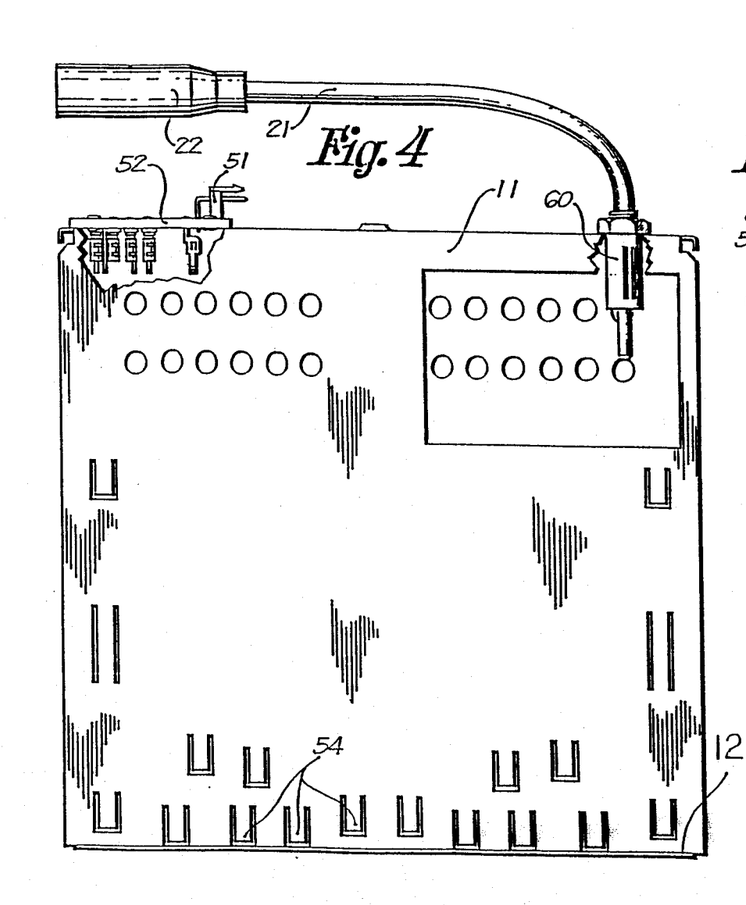
FIG. 4 is a top plan view thereof.

The shuttle or housing 11 is a closely conforning, thin, metal housing enclosing at least three sides of the radio and the rear. The shuttle 11 as seen in FIG. 5 is open at the front. In the preferred embodiment, the shuttle 11 is an open face box of steel having a thickness in the order of 0.022 to 0.026 inches. Emerging from the rear of the shuttle 11 an antenna lead 21 with jack 22, two pair of speaker leads 23 and 24 having respective connectors 25 and 26 at their ends. A ground lead 30 with a shielded spade lug 31 also emerges from the rear of the shuttle 11. A plurality of additional leads 32 including power extend out of the rear of shuttle 11 and terminate in a polarized plug 33. The above leads are not leads from the radio 10 but rather are part of a harness 37 of FIG. 2 which connect to the special jack 50 engaging plug 51 as shown in FIG. 2 but not present in FIG. 1. The shuttle 11 is of thin gauge steel and may be formed from a single flat sheet and folded into the appropriate shape including interlocking teeth 34 providing joints that may be spot welded together to provide a structurally secure enclosure for the radio 10. The internal dimensions of the shutle 11 are matched to the particular high quality radio to be mounted so that the two are in slip fit engagement and the radio 10 and housing or shuttle 11 may easily slip into the opening 20A in the console or dash 20 as best seen in FIG. 3.

One additional element of this invention present is a dummy tape cassette 40 having dimensions and openings corresponding to standard tape cassette or tape cartridges accepted by the radio-tape player 10. Notable however, is a handle 41 extending from the edge of the tape cassette 40 closest to the tape cassette door when the dummy tape 40 is in place. This invention is designed in this embodiment to be used with radio tape players in which th tape is in mechanical engagement with the tape player when in place. Such engagement is illustrated in FIG. 6 in which either locking pin 70 or the capstans 71 extend partly through tape 40 upon insertion into the tape receiving recess 72 of the radio tape player. The direction of movement of the pin 70 and the capstans 71 is illustrated by the heavy double ended arrows in FIG. 4. This movement of drive elements 70 and 71 is initiated by internal mechanical linkage of the tape player unshown and not a part of this invention. FIG. 6 also illustrates the handle 41 as secured within the cassette 40 by an internal wall 40w.

Now referring to FIG. 2, the shuttle 11 may be seen including its cable harness 37 and in socket 50 which matches plug 51. Connector plate 52 is secured with its plug 51 extending parallel to the rear face of the shuttle 11.

FIG. 2 also illustrates the edge flanges 12 and 13 appearing at the front edge of the shutle 11 and the integral locking fingers 54 and 55 on the top edge and sides of the shuttle. These locking fingers 54 and 55 are available to be bent outward to snap through and engage the rear face of the panel 20 of FIG. 1 and the side walls of the opening 20A. In this manner, the shuttle 11 may be inserted the recess 20A with the fingers locking the shuttle in place. At the rear of the shuttle is lead 21 which enters the rear of shuttle 11 and engages a plug 60 which mates with the antenna socket of the rear of the radio 10.

Figure 7:
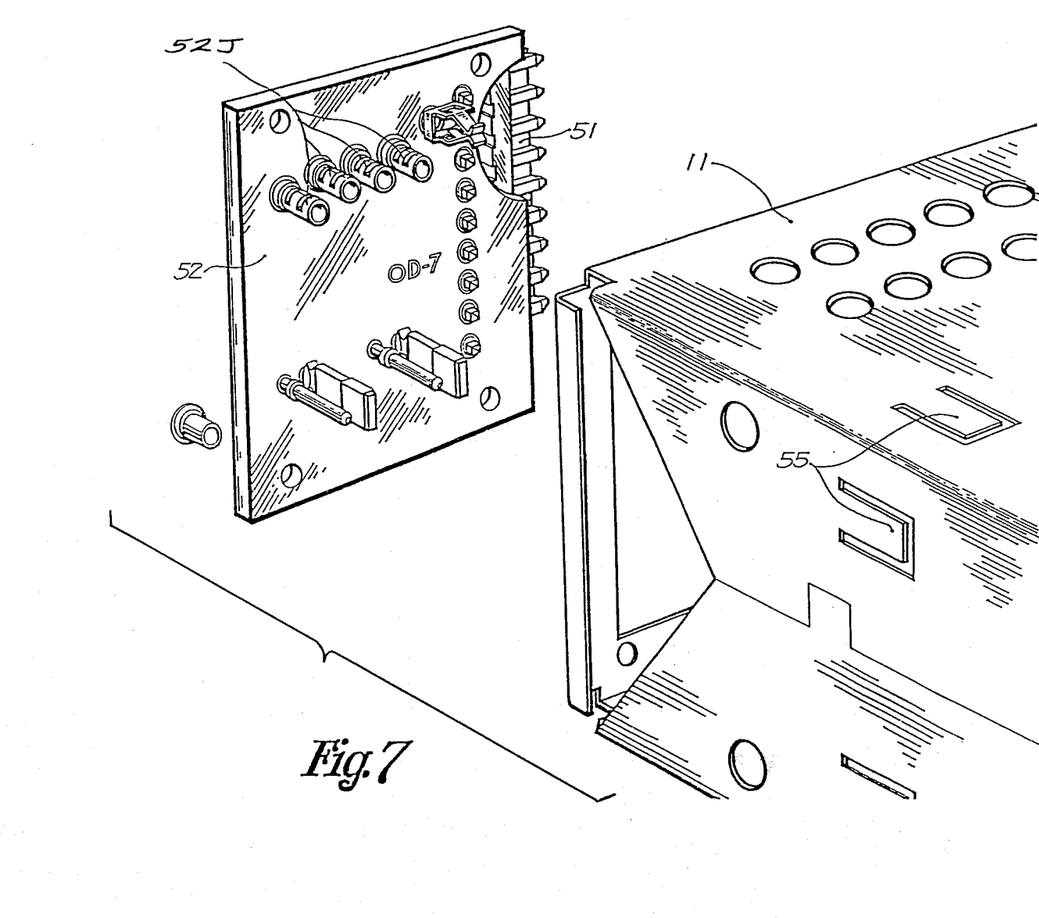
FIG. 7 is a fragmented perspective view of a rear corner of the shuttle of FIG. 1 with a connector board exploded.
Figure 9:
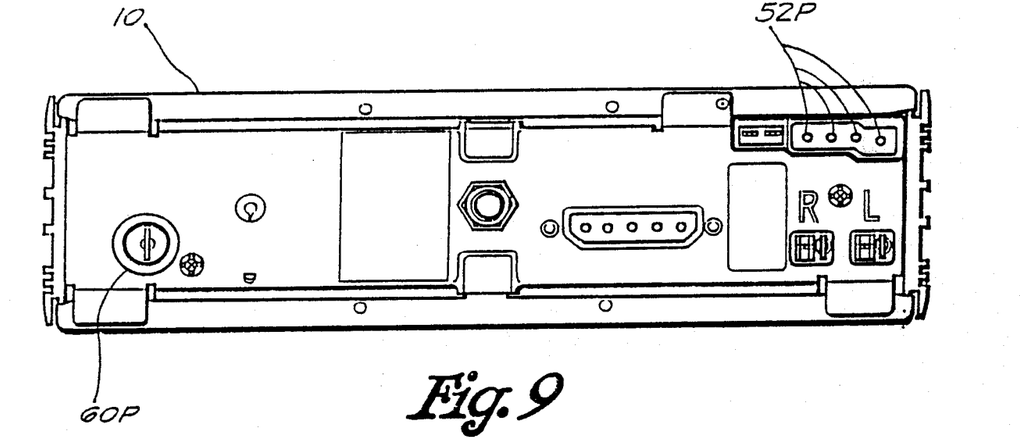
FIG. 9 is a rear elevational view of a typical radio showing its connector placement.
Figure 10:
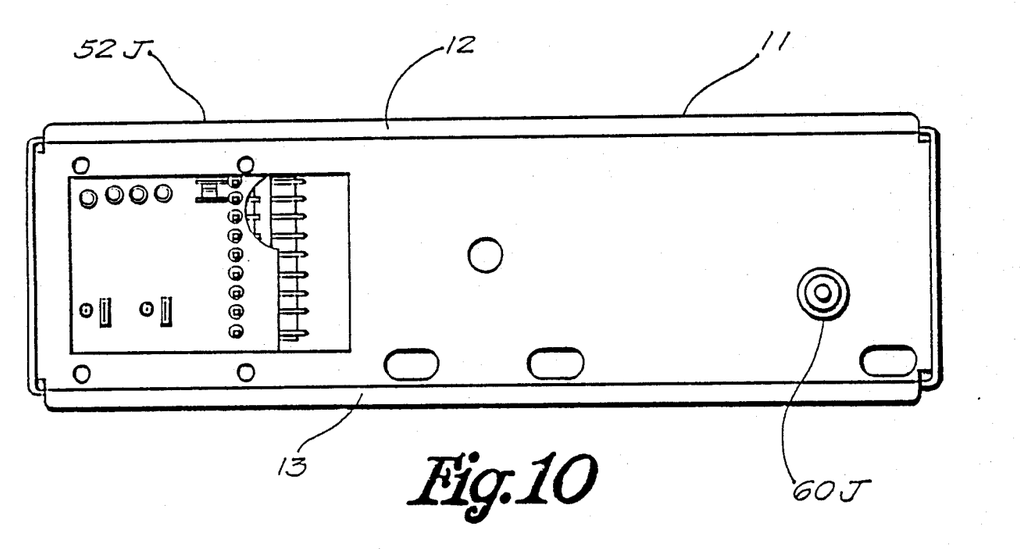
FIG. 10 is a front elevational view of the shuttle of FIG. 8 with the handle removed.

The inner side of the plate 52 mounts on an insulating base and bears a series of connectors which match is location and size the integral sockets on the rear of the radio. This location and size of relationship is illustrated in FIG. 7 and particularly by comparing FIG. 9 and 10 which show the rear of the radio in FIG. 9 with the antenna jack 60J at the right mating with the shuttle plug 60P at the left and the mating plugs 52P on the rear right of the radio 10 which mate with the jack 52J on left rear of the shuttle 11 when the radio is reversed 180 degrees and inserted in the shuttle 11. The close fitting configuration of the shuttle 11 and radio 10 provides proper alignment for these connectors when the radio 10 is placed in the shuttle 11 therby minimizing pin bending and providing a standard insertion and withdrawal force for the radio 10. This force is sufficiently low. for example less than 25 pounds, to which easily allow the radio to be withdrawn from the shuttle 11 by grasping handle 41 of dummy tape 40.

This invention is employed in a automobile is illustrated in FIG. 3 in the following manner. The wiring connectors for the radio from the automobile are located behind the console 20 and unshown in FIG. 3 but located under the dash 20. The wiring connectors are drawn out through the opening 20A and connected to the respective leads of the wiring harness 37 of FIG. 3. This includes a ground lead 30, a power lead 32 and its plug 33, the antenna lead 21 and its jack 22 and speaker connectors 25 and 26. These leads are fed back into the opening 20A and the shuttle 11 is slipped half way into the opening 20A. At that time, the appropriate members of the tab groups 54 and 55 of FIGS. 2 and 5 are bent outward slightly in order that they may snap through the panel 20 or simply engage the wall of the opening 20A. The locking tabs 54 have sharp edges which dig into the rear face of the console or dash 20 and do not allow the shuttle to come out of the opening 20A until the tabs are bent back. Then the radio tape player 10 is simply slid into the shuttle 11 in what appears to be exactly the same position it would be located if installed without the shutle 11. Only the wall thickness of the shuttle 11 lies between the console 20 and the rear face of the radio 10. The radio 10 is now ready for operation in the normal manner.

Whenever the owner has concern for a possible break-in or theft, he merely inserts the dummy tape cassette 40 into the tape opening, pulls gentle on the handle 41 and the entire radio 10 exits the shuttle 11. The radio may then be to be taken and stored hidden in the trunk of the vehicle, or carried off.

For radios without tape players, or if for any reason the dummy tape cassette handle 11 is impractical, I have devised the mininimum visibility handle 80 employing the same shuttle 11 of this invention with a minor change. Again, the shutle 11 does not cause the radio 10 to protrude any more than the shuttle wall thickness of 0.022 to 0.026 inch. The handle 80 is hardly visible when the radio is in place since it lies along the edge trim of the radio 10. This alternate embodiment is illustrated in FIGS. 8, 11 and 12.

The handle 80 is C shaped and is pivoted from edge flanges 81 and 82 of frame 83 which is dimensioned to fit behind the edge lip 16 of the radio 10. It adds only the thickness of frame 83 to the lip 16. The handle 80 is dimensioned to closely fit around the radio edge lip and be hardly noticeable when in place.

Figure 8:
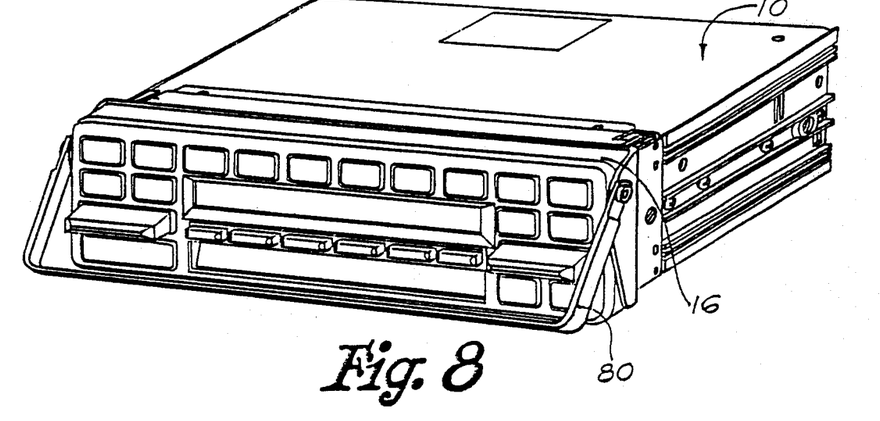
FIG. 8 is a perspective view of an alternate embodiment of the shuttle of the invention.
Figure 11:
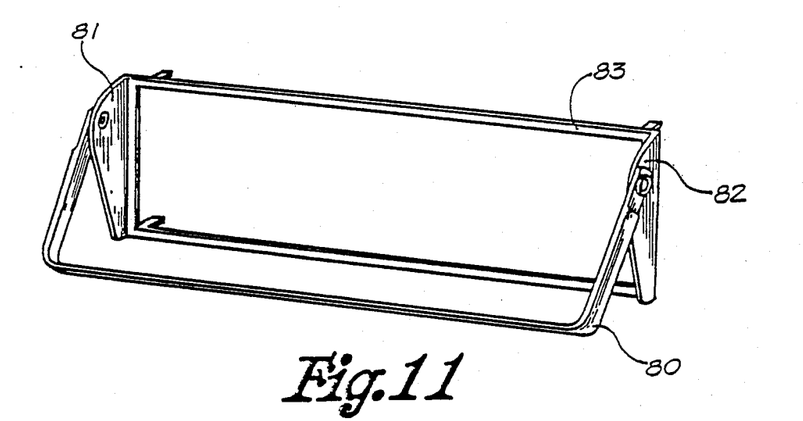
FIG. 11 is a perspective view of the alternate embodiment handle of FIG. 8.
Figure 12:
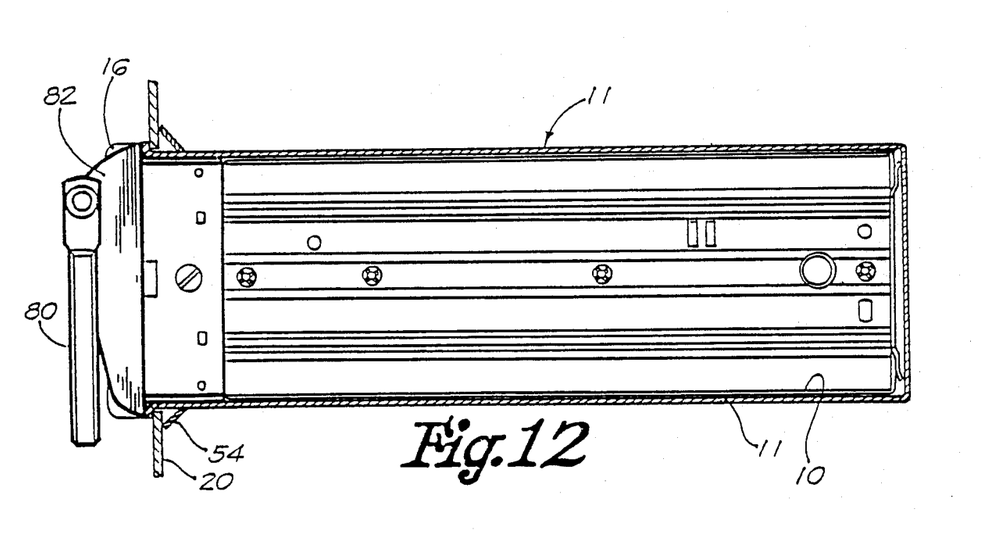
FIG. 12 is a side elevational view partly in section of the radio shuttle combination of FIG. 8.

To remove the radio in the embodiment of FIGS. 8, 11 and 12, one need only reach over, grasp the handle 80, pivot the handle 8 degrees upward and outward and pull the radio 10 from the shuttle 11. The radio 10 is automatically electronically disconnected in the process.

Therefore, I have developed two embodiments of a secure effective shuttle arrangement for holding a radio or radio-tape player in place in the automobile dash or console and to allow its virtually instantaneous removal for storage or safekeeping. This invention employs a handle which, in one embodiment, forms a part of a dummy tape cassette, and in the second embodiment, folds to be virtually invisible. The shuttle 10 itself is a thin wall metal enclosure conforming almost exactly to the radio external dimensions and including integral plugs and jacks which mate directly with the radio jacks and plugs so that upon insertion of the radio 10 into the shuttle 11, all electrical connection are automatically made and upon removal by either form of handle, the same electrical connections disengage automatically.

Figure 13:
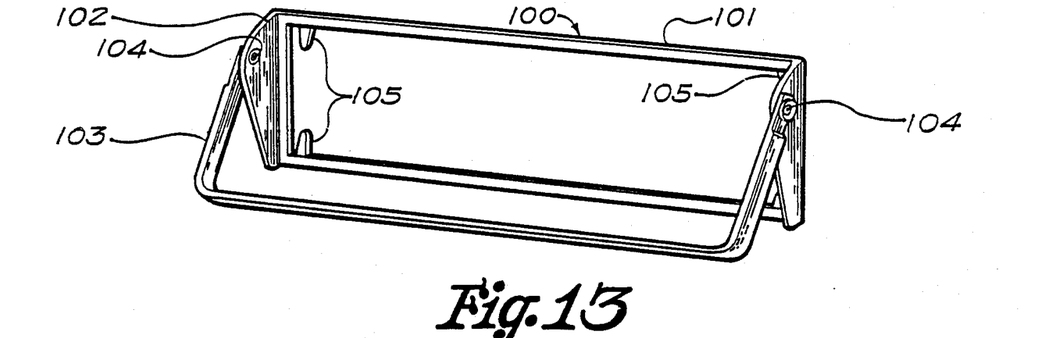
FIG. 13 is a perspective view of a handle-frame and assembly in accordance with this invention.
Figure 14:
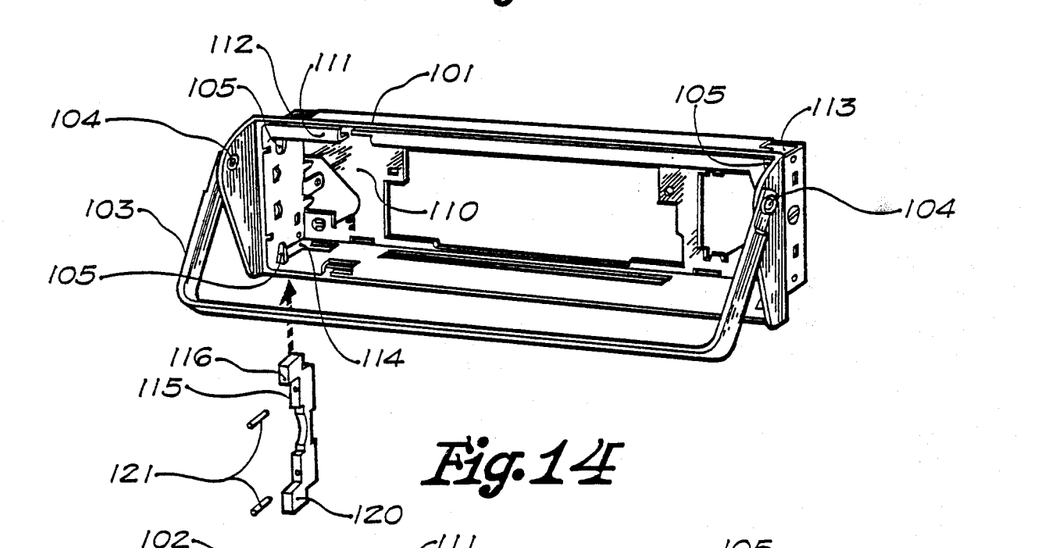
FIG. 14 is a perspective view, partly exploded showing the locking bars and tabs of this invention.
Figure 15:
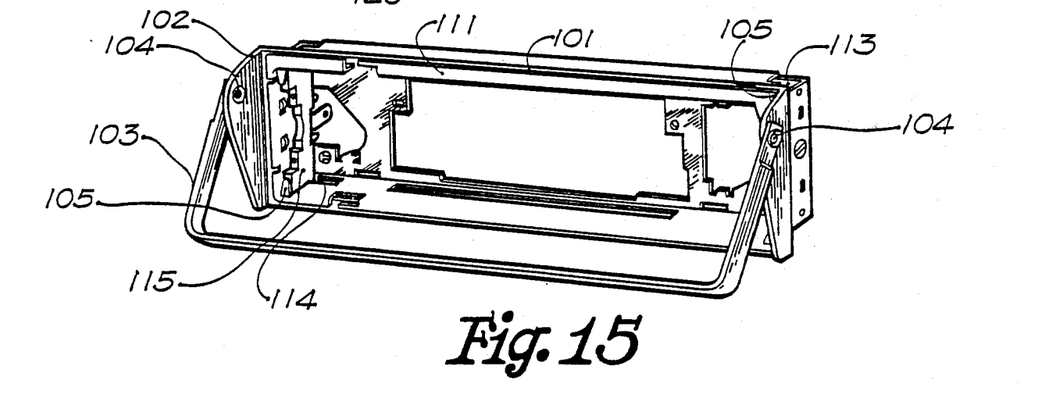
FIG. 15 is a perspective view of the handle assembly of this inventiton attended to the front member of an electronic package.

Now referring to FIGS. 13 through 15, the particular invention is best disclosed therein. Thus showing a novel handle assembly, providing a greater degree of rigidity when assembled than in the prior art and likewise is preferred over the embodiment of FIGS. 8 through 12.

In the embodiment of FIG. 13, the handle assembly generally designated 100 includes a frame member 101 of thin sheet material, preferably metal of 22 gauge or thickness (0.028–0.032 in.) having an opening therein which corresponds to the lateral dimensions of the radio or electronic equipment to be carried. The outer dimensions of the frame 101 correspond to the dimension of the face flange of the electronic equipment, except that two ears 102 extend slightly beyond the sides of the face flange to mount a handle 103 which is pivoted by rivets 104 from the side ears. Then handle 103 is dimensioned that it rests immediately below the flanged front face of the electronic equipment when not in use.

Extending into the opening of frame 101 are four tabs 105. This is similar to the tabs of FIG. 11, however, tabs 105 in their normal position extend into the opening within the frame 101. When the frame assembly 100 of FIG. 13 is to be installed upon the radio or other electronic equipment, the tabs 105 are folded 90 degrees to allow the frame 101 to slip over the exterior of the electronic equipment enclosure from the rear so that the frame rests against the rear face of the flanged front face of the electronic equipment.

Referring now to FIG. 14, the handle assembly 100 is shown in place on the outer enclosure 110 of the electronic equipment or radio with the frame 101 in place behind a front flange 111 and with the tabs 105 re-bent to their normal position of FIG. 13. The tabs 105 extend through openings 112, 113, and 114 as well as an unnumbered similar opening in the lower right hand corner of the frame 110 but not appearing in FIG. 14.

Shown exploded from the assembly of FIG. 14 is a locking bar 115 having a rear face which rests against the rear of the box-like portion of electronic assembly 110 and with two front feet 116, 120, which, as may be seen in FIG. 15 bear against the rear side of the tabs 105 and lock these tabs firmly in position. The locking bar 115 is held in position by machine screws or set-screws 121 which engage the rear wall of the box-like portion 110 of the radio or electronic equipment enclosure.

Given the use of the vertical tabs and the locking bar 115, the handle assembly 100 is securely attached to the electronic equipment by its box 110.

Whenever the handle 103 is not in use, it is folded downward beyond the position shown in FIG. 15 and is virtually unnoticed. When in use, it is pivoted outward and provides a rigidly attached handle assembly for removing or replacing the electronic equipment. The tabs 105 bear against the front of the slots 111 through 114 and against the front faces of the feet 116 and 120. When once assembled, the handle assembly 100 will remain in place with the electronic equipment for its life.

This invention shall not be limited to the illustrative embodiments but rather to the claims as set forth below which constitute definitions of this invention including the protection afforded by the doctrine of equivalents.

I claim:

1. In a foldable handle assembly for vehicle dash mounted electronic equipment having an enclosure with a flanged front face comprising:
   a frame of substantially rigid sheet material having an opening therein corresponding to the exterior dimensions of the enclosure and a size corresponding substantially to the flanged front of said enclosure;
   said frame including a pair of ears extending in front of the front face of the enclosure from opposite sides thereof;
   a handle pivotally secured to said pair of ears and having dimensions closely approximating the dimensions of the flanged front face of the electronic assembly enclosure whereby said handle may be pivoted from a virtually unnoticable position along the flanged front face of the electronic equipment to a working position in front of said flanged front face;

the improvement by which said frame is securable to said electronic equipment by tabs extending through openings in the enclosure of said electronic equipment and bearing upon one edge of said openings; and locking means having one surface bearing gupon said tabs to hold said tabs against the edge of said opening and a second surface bearing against said enclosure.

2. A foldable handle assembly in accordance with claim 1 wherein said tabs are integral with said frame bendable to allow the passage of the frame of the handle assembly over the exterior of the enclosure of the electronic equipment and rebendable into engaging position with one edge of corresponding openings in said enclosure and said locking means comprises a bar having opposite surfaces, one engaging a face of said tab and the second surface engaging a surface of said enclosure.

3. A foldable handle assembly in accordance with claim 1 including means for securing said locking bar to said enclosure.

* * * * *